(12) United States Patent
He et al.

(10) Patent No.: US 6,452,488 B1
(45) Date of Patent: Sep. 17, 2002

(54) VEHICLE THEFT INDICATING DEVICE

(76) Inventors: Yuan Jing He, 1581 West St., Fort Lee, NJ (US) 07024; Bi-Xing Chen, 1581 West St., Fort Lee, NJ (US) 07024

( * ) Notice: Subject to any disclaimer, the term of this patent is extended or adjusted under 35 U.S.C. 154(b) by 31 days.

(21) Appl. No.: 09/770,264

(22) Filed: Jan. 26, 2001

(51) Int. Cl.$^7$ .................................................. B60Q 1/26
(52) U.S. Cl. ..................... 340/468; 340/425.5; 340/472; 340/825.69
(58) Field of Search .............................. 340/468, 425.5, 340/426, 825.69, 825.72, 472, 384.4, 331, 332

(56) References Cited

U.S. PATENT DOCUMENTS

| | | | |
|---|---|---|---|
| 2,031,170 A | * 2/1936 | Lester | .......................... 240/7.1 |
| D186,548 S | 11/1959 | Marshall | |
| 3,578,964 A | 5/1971 | Sherman | |
| 3,947,815 A | 3/1976 | Muncheryan | |
| 4,113,408 A | 9/1978 | Wurtz et al. | |
| 4,375,634 A | * 3/1983 | Leis | ........................... 340/472 |
| 4,745,530 A | * 5/1988 | Farrell, Jr. et al. | .......... 362/226 |
| 5,278,556 A | * 1/1994 | Oh | ......................... 340/825.69 |
| 5,673,989 A | 10/1997 | Gohl et al. | |
| 5,742,227 A | 4/1998 | Escareno et al. | |
| 5,786,758 A | * 7/1998 | Bullock | ....................... 340/539 |
| 5,825,281 A | * 10/1998 | McCreary | ................. 340/425.5 |
| 5,933,081 A | * 8/1999 | Jones | ..................... 340/825.69 |
| 6,067,012 A | * 5/2000 | Harding | ....................... 340/472 |
| 6,246,314 B1 | * 6/2001 | Djaid | ...................... 340/425.5 |

* cited by examiner

Primary Examiner—John Tweel (57) ABSTRACT

A vehicle theft indicating device for alerting the police and others that the vehicle is stolen. The vehicle theft indicating device includes a light-emitting support member being adapted to be securely attached to a top of a roof of a vehicle; and also includes a light-emitting assembly including a light socket member being securely attached to the light-emitting support member and being adapted to be connected to a power supply, and also including a light-emitting member being disposed in the light socket member, and further including a transmitter for activating the light-emitting member; and further includes a transparent cover being removably disposed over the light-emitting member and being securely attached to the light-emitting support member with fasteners.

17 Claims, 6 Drawing Sheets

VEHICLE THEFT INDICATING DEVICE

BACKGROUND OF THE INVENTION

1. Field of the Invention

The present invention relates to a vehicle theft light and more particularly pertains to a new vehicle theft indicating device for alerting the police and others that the vehicle is stolen.

2. Description of the Prior Art

The use of a vehicle theft light is known in the prior art. More specifically, a vehicle theft light heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,742,227; 3,947,815; 5,673,989; 4,113,408; U.S. Pat. No. Des. 186,548; and U.S. Pat. No. 3,578,964.

While these devices fulfill their respective, particular objectives and requirements, the aforementioned patents do not disclose a new vehicle theft indicating device. The inventive device includes a light-emitting support member being adapted to be securely attached to a top of a roof of a vehicle; and also includes a light-emitting assembly including a light socket member being securely attached to the light-emitting support member and being adapted to be connected to a power supply, and also including a light-emitting member being disposed in the light socket member, and further including a transmitter for activating the light-emitting member; and further includes a transparent cover being removably disposed over the light-emitting member and being securely attached to the light-emitting support member with fasteners.

In these respects, the vehicle theft indicating device according to the present invention substantially departs from the conventional concepts and designs of the prior art, and in so doing provides an apparatus primarily developed for the purpose of alerting the police and others that the vehicle is stolen.

SUMMARY OF THE INVENTION

In view of the foregoing disadvantages inherent in the known types of vehicle theft light now present in the prior art, the present invention provides a new vehicle theft indicating device construction wherein the same can be utilized for alerting the police and others that the vehicle is stolen.

The general purpose of the present invention, which will be described subsequently in greater detail, is to provide a new vehicle theft indicating device which has many of the advantages of the vehicle theft light mentioned heretofore and many novel features that result in a new vehicle theft indicating device which is not anticipated, rendered obvious, suggested, or even implied by any of the prior art vehicle theft light, either alone or in any combination thereof.

To attain this, the present invention generally comprises a light-emitting support member being adapted to be securely attached to a top of a roof of a vehicle; and also includes a light-emitting assembly including a light socket member being securely attached to the light-emitting support member and being adapted to be connected to a power supply, and also including a light-emitting member being disposed in the light socket member, and further including a transmitter for activating the light-emitting member; and further includes a transparent cover being removably disposed over the light-emitting member and being securely attached to the light-emitting support member with fasteners.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle theft indicating device which has many of the advantages of the vehicle theft light mentioned heretofore and many novel features that result in a new vehicle theft indicating device which is not anticipated, rendered obvious, suggested, or even implied by any of the prior art vehicle theft light, either alone or in any combination thereof.

It is another object of the present invention to provide a new vehicle theft indicating device which may be easily and efficiently manufactured and marketed.

It is a further object of the present invention to provide a new vehicle theft indicating device which is of a durable and reliable construction.

An even further object of the present invention is to provide a new vehicle theft indicating device which is susceptible of a low cost of manufacture with regard to both materials and labor, and which accordingly is then susceptible of low prices of sale to the consuming public, thereby making such vehicle theft indicating device economically available to the buying public.

Still yet another object of the present invention is to provide a new vehicle theft indicating device which provides in the apparatuses and methods of the prior art some of the advantages thereof, while simultaneously overcoming some of the disadvantages normally associated therewith.

Still another object of the present invention is to provide a new vehicle theft indicating device for alerting the police and others that the vehicle is stolen.

Yet another object of the present invention is to provide a new vehicle theft indicating device which includes a light-emitting support member being adapted to be securely attached to a top of a roof of a vehicle; and also includes a light-emitting assembly including a light socket member being securely attached to the light-emitting support member and being adapted to be connected to a power supply, and also including a light-emitting member being disposed in the light socket member, and further including a transmitter for activating the light-emitting member; and further includes a transparent cover being removably disposed over the light-emitting member and being securely attached to the light-emitting support member with fasteners.

Still yet another object of the present invention is to provide a new vehicle theft indicating device that would be highly visible to others including the police upon the vehicle being stolen.

Even still another object of the present invention is to provide a new vehicle theft indicating device that would be easily and conveniently installed in new and old vehicles alike.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 6 thereof, a new vehicle theft indicating device embodying the principles and concepts of the present invention and generally designated by the reference numeral 10 will be described.

As best illustrated in FIGS. 1 through 6, the vehicle theft indicating device 10 generally comprises a light-emitting support member 11 being adapted to be securely attached to a top of a roof 36 of a vehicle 35. The light-emitting support member 11 has a plate-like base portion 12 which is adapted to rest upon the roof 36 of the vehicle 35, and also has a tubular portion 16 being conventionally disposed upon a top side of the plate-like base portion 12 and having an open top 19 and a cavity 18 disposed therein. and further has a threaded boss-like portion 21 being securely and conventionally attached to a bottom side of the plate-like base portion 12 and being adapted to be disposed in a hole 37 in the roof 36 of the vehicle 35 and to be fastened to the roof 36 of the vehicle 35 with a fastening member 32. The plate-like base portion 12 has holes 13,14 being disposed therethrough and having an opening 15 being disposed therethrough with the threaded boss-like portion 21 being aligned with the opening 15. The threaded boss-like portion 21 has a bore 22 extending therethrough. The tubular portion 16 includes a side wall 17 having a plurality of holes 20 disposed therethrough.

A light-emitting assembly includes a light socket member 23 being securely and conventionally attached to the light-emitting support member 11 and being adapted to be connected to a power supply, and also includes a light-emitting member 25 being disposed in the light socket member 23, and further includes a transmitter 26 for activating and de-activating the vehicle theft indicating device 10, and also includes a receiver 38 being conventionally connected to the light socket member 23 for receiving signals from the transmitter 26 and for arming and disarming the vehicle theft indicating device 10. The light socket member 23 includes wires 24 extending therefrom and being disposed through the opening 15 of the plate-like base portion 12 and through the bore 22 of the threaded boss-like portion 21. The light socket member 23 is fastened to the plate-like base portion 12 with fastener members 34 which are disposed in the holes 13,14 of the plate-like base portion 12.

A transparent cover 27 is removably disposed over the light-emitting member 25 and is securely attached to the light-emitting support member 11 with fasteners 33. The transparent cover 27 is removably secured in the cavity 18 of the tubular portion 16 with the fasteners 33 being disposed through the holes 20 of the side wall 17 of the tubular portion 16.

As a first embodiment, the transparent cover 27 is a globe having a plurality of sides 28 and being hexagonal shaped as view from a top thereof. As a second embodiment, the transparent cover 27 is a round globe 29 having a bulbous head portion 30 and a neck portion 31 which has an opening through a bottom thereof.

Figure 1:
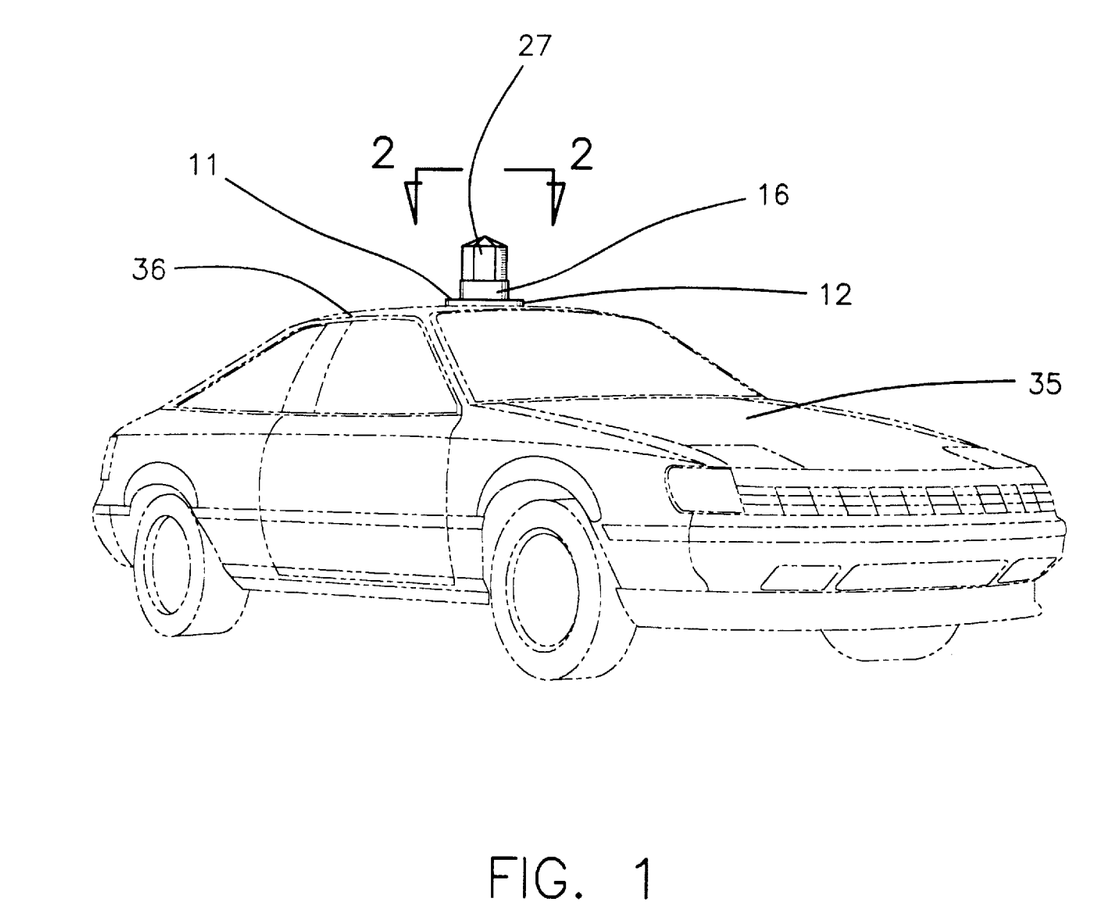
FIG. 1 is a perspective view of a new vehicle theft indicating device according to the present invention and being mounted to a vehicle.
Figure 2:
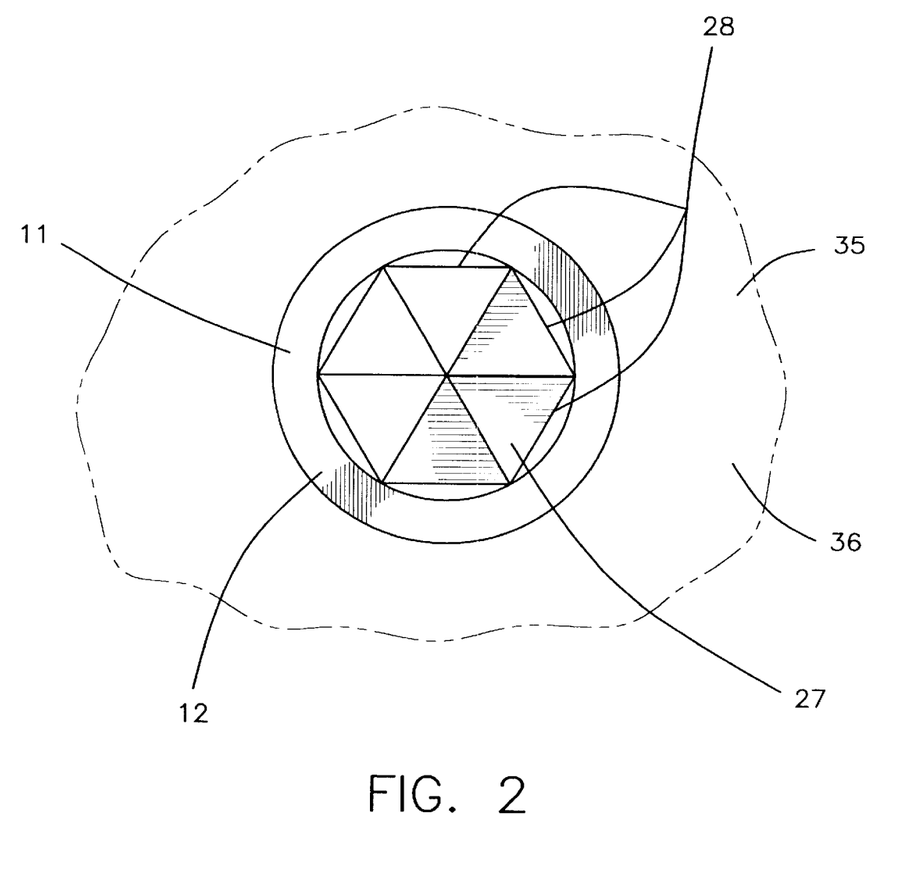
FIG. 2 is a top plan view of the present invention.
Figure 3:
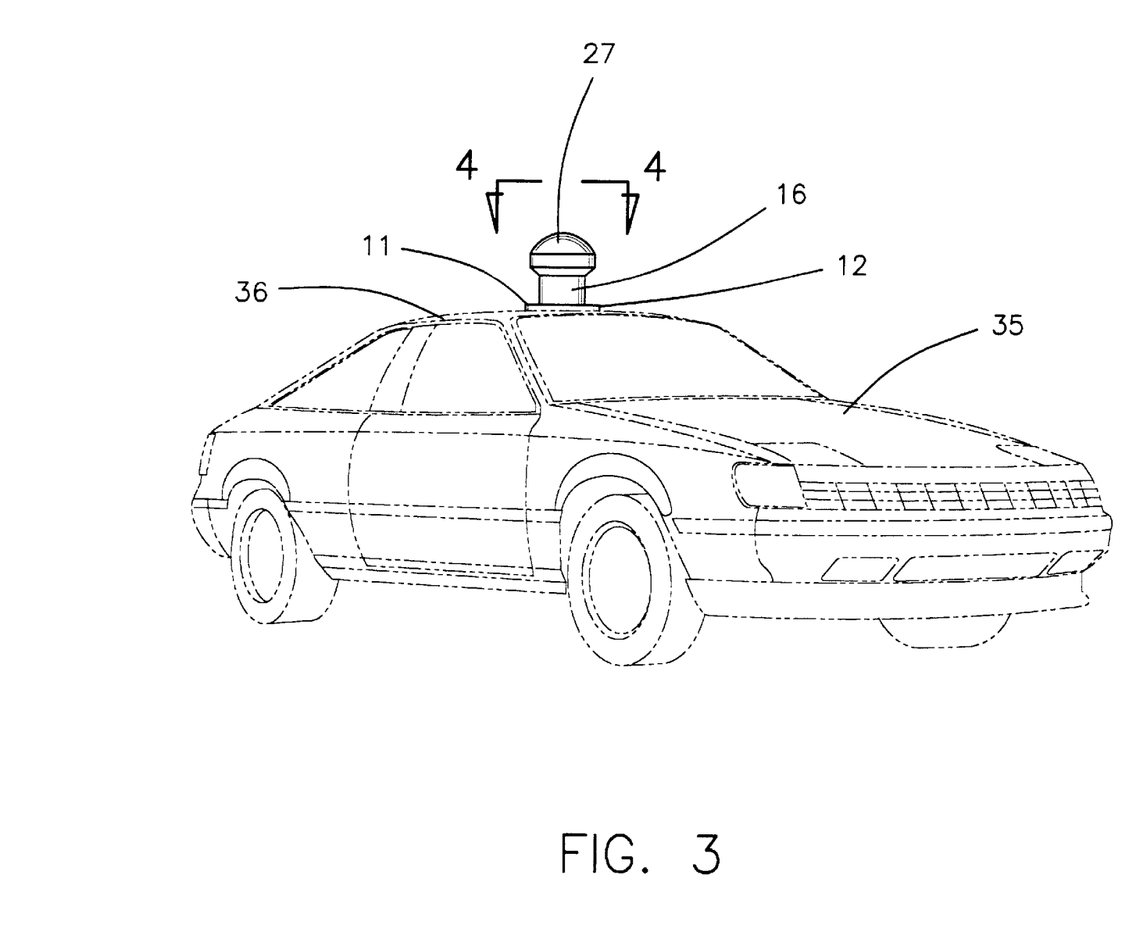
FIG. 3 is a perspective view of a second embodiment of the present invention shown being mounted to a vehicle.
Figure 4:
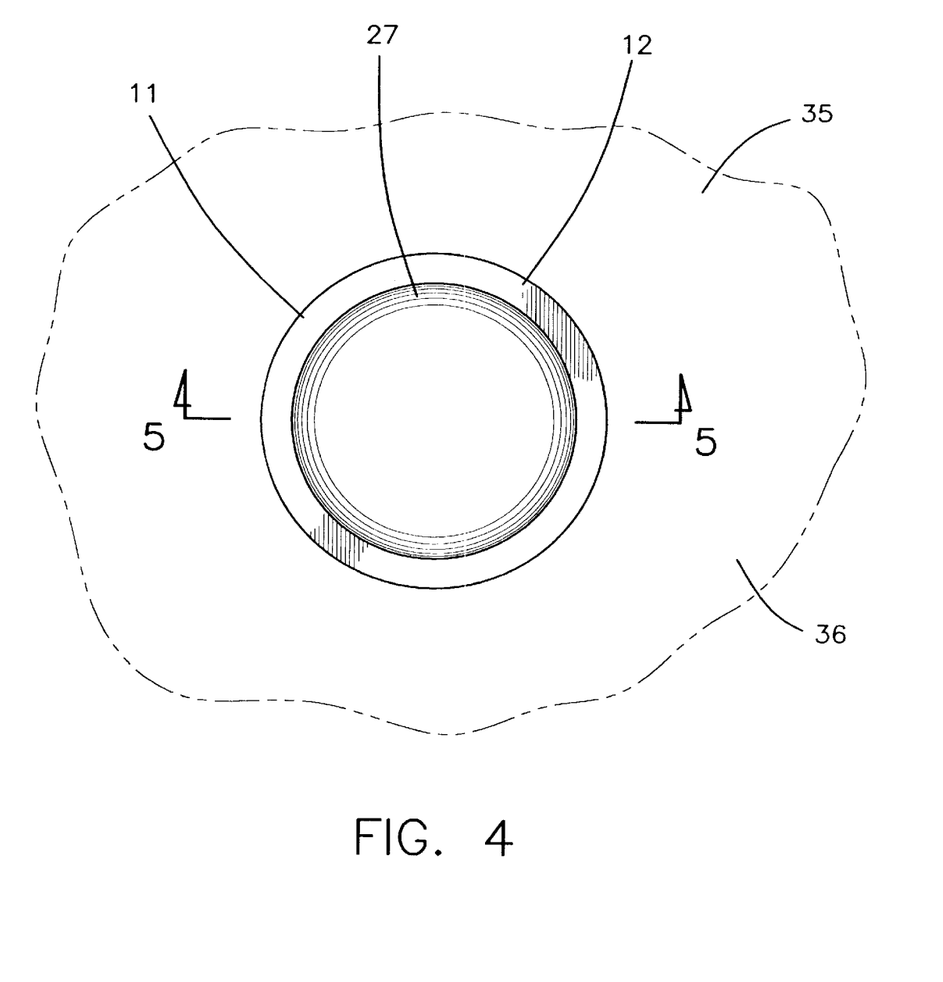
FIG. 4 is a top plan view of the second embodiment of the present invention.
Figure 5:
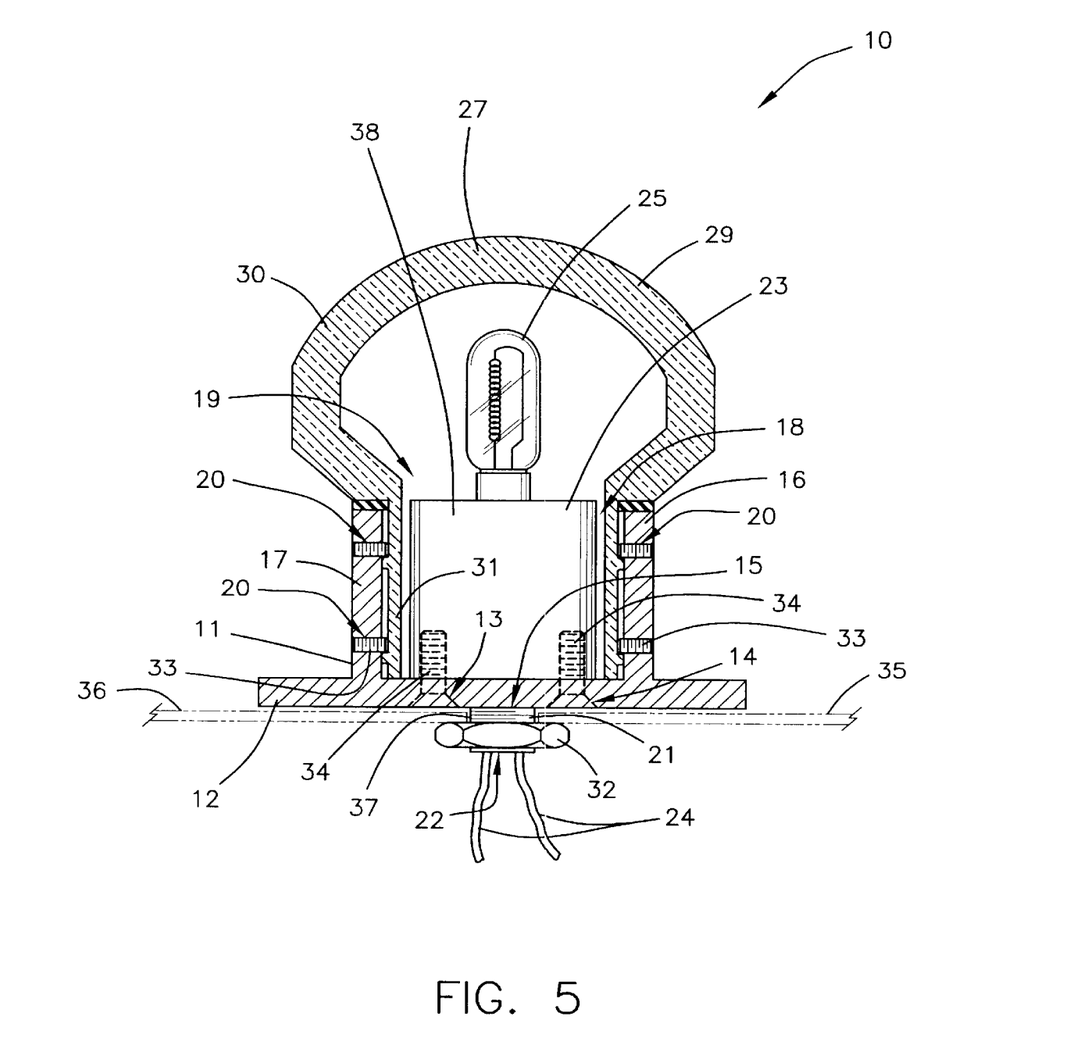
FIG. 5 is a cross sectional view of the second embodiment of the present invention.
Figure 6:
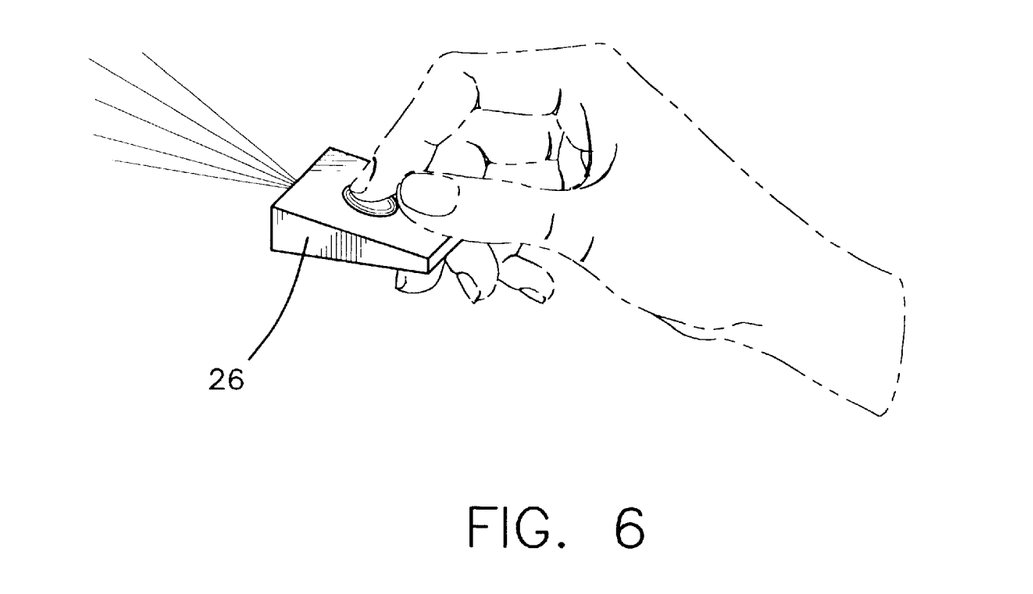
FIG. 6 is a perspective view of a transmitter of the present invention.

In use, the user activates the vehicle theft indicating device 10 by depressing the button on the transmitter 26. Upon a thief entering the vehicle 35, the light-emitting member 25 would be turned off. The vehicle theft indicating device 10 would be activated upon the user entering the vehicle by the user depressing the button on the transmitter 26 so that the light-emitting member 25 is energized and glows.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. and accordingly, all suitable modifications and equivalents may be resorted to, falling within the scope of the invention.

We claim:

1. A vehicle theft indicating device comprising:

a light-emitting support member being adapted to be securely attached to a top of a roof of a vehicle;

a light-emitting assembly including a light socket member being securely attached to said light-emitting support member and being adapted to be connected to a power supply, and also including a light-emitting member being disposed in the light socket member, and further including a transmitter for activating and de-activating said vehicle theft indicating device, and also including a receiver being conventionally connected to said light socket member for receiving signals from said transmitter and for arming and disarming said vehicle theft indicating device; and a transparent cover being removably disposed over said light-emitting member and being securely attached to said light-emitting support member with fasteners;

wherein said light-emitting support member has a plate-like base portion which is adapted to rest upon the roof of the vehicle, and also has a tubular portion being disposed upon a top side of said plate-like base portion and having an open top and a cavity disposed therein, and further has a threaded boss-like portion being securely attached to a bottom side of said plate-like base portion and being adapted to be disposed in a hole in the roof of the vehicle and to be fastened to the roof of the vehicle with a fastening member.

2. A vehicle theft indicating device as described in claim 1, wherein said plate-like base portion has holes being disposed therethrough and has an opening being disposed therethrough with said threaded boss-like portion being aligned with said opening, said threaded boss-like portion having a bore extending therethrough.

3. A vehicle theft indicating device as described in claim 1, wherein said tubular portion includes a side wall having a plurality of holes disposed therethrough.

4. A vehicle theft indicating device as described in claim 3, wherein said transparent cover is removably secured in said cavity of said tubular portion with said fasteners being disposed through said holes of said side wall of said tubular portion.

5. A vehicle theft indicating device as described in claim 1, wherein said transparent cover is a globe having a plurality of sides and being hexagonal shaped as view from a top thereof.

6. A vehicle theft indicating device as described in claim 1, wherein said transparent cover is a round globe having a bulbous upper portion and a neck portion which has an opening through a bottom thereof.

7. A vehicle theft indicating device as described in claim 1, wherein said light socket member includes wires extending therefrom and being disposed through said opening of said plate-like base portion and through said bore of said threaded boss-like portion, said light socket member being fastened to said plate-like base portion with fastener members which are disposed in said holes of said plate-like base portion.

8. A vehicle theft indicating device comprising:

a light-emitting support member being adapted to be securely attached to a top of a roof of a vehicle, said light-emitting support member having a plate-like base portion which is adapted to rest upon the roof of the vehicle, and also having a tubular portion being disposed upon a top side of said plate-like base portion and having an open top and a cavity disposed therein, and further having a threaded boss-like portion being securely attached to a bottom side of said plate-like base portion and being adapted to be disposed in a hole in the roof of the vehicle and to be fastened to the roof of the vehicle with a fastening member, said plate-like base portion having holes being disposed therethrough and having an opening being disposed therethrough with said threaded boss-like portion being aligned with said opening, said threaded boss-like portion having a bore extending therethrough. said tubular portion including a side wall having a plurality of holes disposed therethrough;

a light-emitting assembly including a light socket member being securely attached to said light-emitting support member and being adapted to be connected to a power supply, and also including a light-emitting member being disposed in said light socket member, and further including a transmitter for activating and de-activating said vehicle theft indicating device, and also including a receiver being conventionally connected to said light socket member for receiving signals from said transmitter and for arming and disarming said vehicle theft indicating device, said light socket member including wires extending therefrom and being disposed through one of said holes of said plate-like base portion and through said bore of said threaded boss-like portion, said light socket member being fastened to said plate-like base portion with fastener members which are disposed in said holes of said plate-like base portion; and a transparent cover being removably disposed over said light-emitting member and being securely attached to said light-emitting support member with fasteners, said transparent cover being removably secured in said cavity of said tubular portion with said fasteners being disposed through said holes of said side wall of said tubular portion.

9. A vehicle theft indicating device as described in claim 8, wherein said transparent cover is a globe having a plurality of sides and being hexagonal shaped as view from a top thereof.

10. A vehicle theft indicating device as described in claim 8, wherein said transparent cover is a round globe having a bulbous upper portion and a neck portion which has an opening through a bottom thereof.

11. A vehicle theft indicating device comprising:

a light-emitting support member for attaching to a roof of a vehicle;

a light-emitting assembly including a light socket member attached to said light-emitting support member, and a light-emitting member being disposed in the light socket member;

a transmitter for activating and de-activating said vehicle theft indicating device;

a receiver being connected to said light socket member for receiving signals from said transmitter; and a transparent cover mounted on said light-emitting support member;

wherein said light-emitting support member has a base portion which is adapted to rest upon the roof of the vehicle, a tubular portion being disposed upon a top side of said base portion and having an open top and a cavity disposed therein, and a threaded portion extending from a bottom side of said base portion for disposing in a hole in the roof of the vehicle to be fastened to the roof of the vehicle with a fastening member.

12. A vehicle theft indicating device as described in claim 11, wherein said base portion has holes being disposed therethrough and has an opening being disposed therethrough with said threaded portion being aligned with said opening, said threaded portion having a bore extending therethrough.

13. A vehicle theft indicating device as described in claim 11, wherein said tubular portion includes a side wall having a plurality of holes disposed therethrough.

14. A vehicle theft indicating device as described in claim 13, wherein said transparent cover is removably secured in said cavity of said tubular portion with said fasteners being disposed through said holes of said side wall of said tubular portion.

15. A vehicle theft indicating device as described in claim 11, wherein said transparent cover is a globe having a plurality of sides and being hexagonal shaped as view from a top thereof.

16. A vehicle theft indicating device as described in claim 11, wherein said transparent cover is a round globe having a bulbous upper portion and a neck portion which has an opening through a bottom thereof.

17. A vehicle theft indicating device as described in claim 11, wherein said light socket member includes wires extending therefrom and being disposed through said opening of said base portion and through said bore of said threaded portion, said light socket member being fastened to said base portion with fastener members which are disposed in said holes of said base portion.

* * * * *